UNITED STATES PATENT OFFICE.

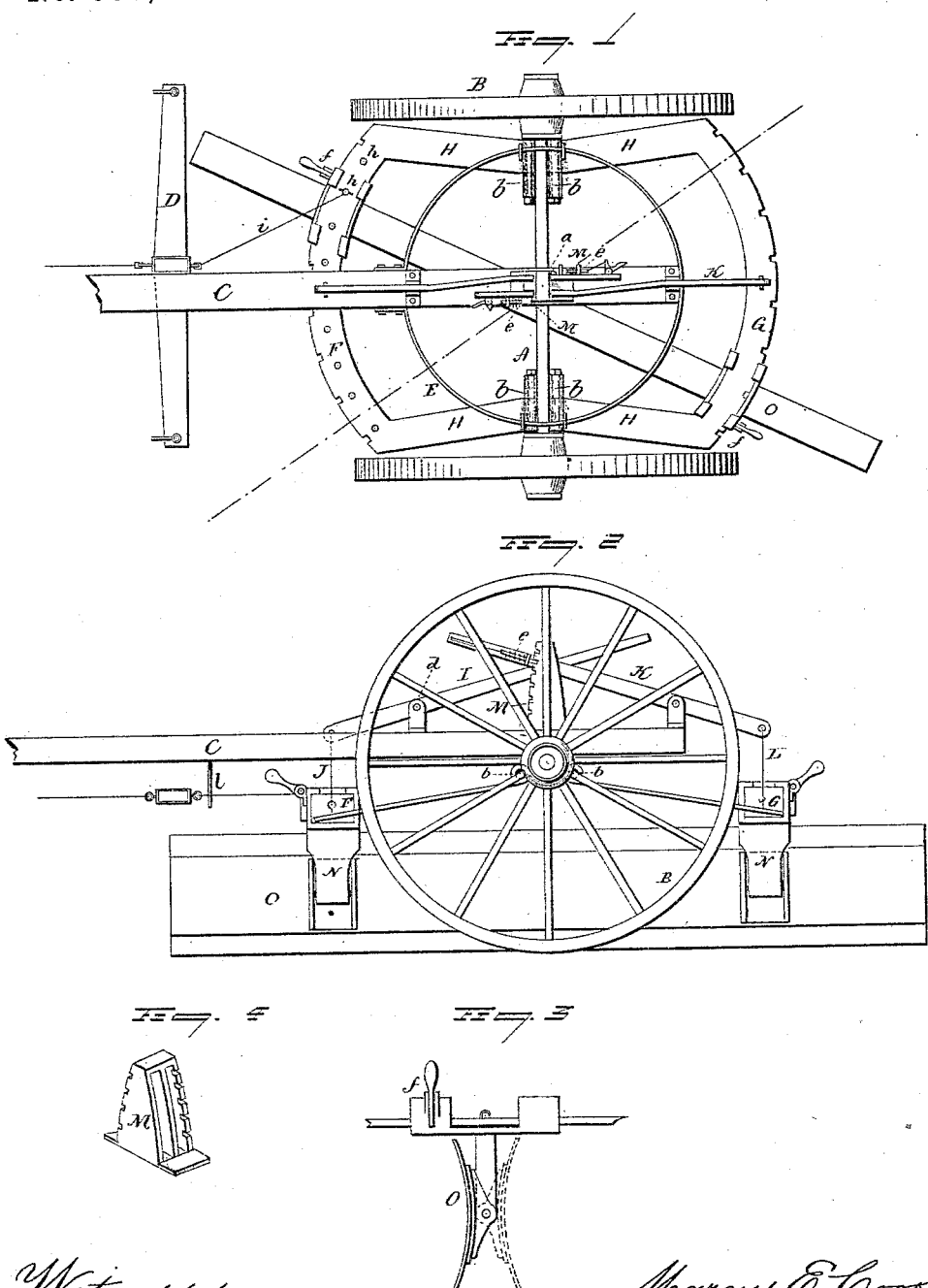

MARCUS E. COOK, OF WALLINGFORD, CONNECTICUT, ASSIGNOR TO THE AMERICAN ROAD MACHINE COMPANY, OF KENNETT SQUARE, PA.

ROAD-SCRAPER.

SPECIFICATION forming part of Letters Patent No. 359,850, dated March 22, 1887.

Application filed May 19, 1886. Serial No. 202,615. (No model.)

*To all whom it may concern:*

Be it known that I, MARCUS E. COOK, of Wallingford, in the county of New Haven and State of Connecticut, have invented a new Improvement in Road-Scrapers; and I do hereby declare the following, when taken in connection with accompanying drawings, and the letters of reference marked thereon, to be a full, clear, and exact description of the same, and which said drawings constitute part of this specification, and represent, in—

Figure 1, a top view of the machine complete; Fig. 2, a side view of the same; Fig. 3, an end view of the scraper, showing the hanger on one of the segments; Fig. 4, a perspective view of the rack M.

This invention relates to an improvement in that class of road-scrapers in which a scraper is carried upon wheels for the purpose of leveling, grading, and like uses in road-making, and in which the scraper is made adjustable to different angles to the path of movement of apparatus, and also to different elevations, the object of the invention being to practically adapt such a scraper to two wheels only; and it consists in the construction hereinafter described, and particularly recited in the claims.

A represents the axle, to which the wheels B B are applied in the usual manner for carriage-wheels; C, the beam or pole, to which the animal or animals are to be attached. This pole is fixed centrally to the axle and extends forward, and may be provided with the usual evener, D, to which the animals are attached.

E represents the frame, which is in the form of a circle and fixed to the beam and axle, and upon which a floor may be laid for the convenience of the attendant. Beneath the frame are two segments, F G, the one, F, forward of the axle and the other to the rear, the segments being parts of a circle, of which the common center is at the axle, as at *a*. The segments are in length corresponding to the space between the wheels—that is, so as to stand freely between the wheels, as seen in Fig. 1—and from each end of the segments an arm, H, extends toward to the axle, the said arms hinged thereto, or to the frame, as indicated at *b*, Fig. 2, and so that the segments may turn upon their respective hinges, to be raised or lowered as occasion may require. On the frame above, a lever, I, is hung upon a fulcrum, *d*, the forward arm of the lever connected by a link, J, with the segment F, the other arm of the lever extending toward the axle to form a handle, by which the lever may be operated, and so that as the handle end of the lever is depressed the segment will be raised accordingly, or vice versa. At the rear is a similar lever, K, in connection with the segment G by a link, L, and so that the segment G may be raised or lowered by means of the said lever.

On the frame is a fixed toothed rack, M, with the teeth of which a spring-bolt, *e*, on the respective levers may engage, and so that the levers may be locked at any position to which they may be adjusted, the bolt *e* engaging a notch in the rack M when such position is attained.

On each of the segments F G a hanger, N, is arranged so as to slide freely on the segments. The hanger extends downward and is hinged to the back of the scraper O, midway of the height of the scraper, and so that the scraper may be turned either edge up, as occasion may require, and as indicated in Fig. 3. The scraper being attached to the hangers, and the hangers movable on the segments, the scraper may be turned to any desirable angle, and when working at one angle—say as seen in Fig. 1— one face of the scraper will be presented; but if turned to the opposite angle, as indicated by the broken line X X, then the other face will be required, and the scraper will be turned accordingly, and, as indicated in broken lines, Fig. 3, so as to always present the working-face of the scraper forward.

To lock the scraper at the desired angle, a dog, *f*, is arranged upon each hanger, adapted to engage in either of the corresponding notches in the segments, and so as to hold the scraper at that angular position. The scraper is adjusted to different angles by simply sliding the hangers accordingly, and it may be adjusted to different elevations by means of levers K, either bodily or one end up and the other down, the adjustment at each end being independent the one of the other.

As the scraper is at work, and owing to its angular position, the tendency of the advance movement is to force the whole apparatus toward the side opposite the working-face in a two-wheel machine, whereas in a four-wheel machine such tendency is resisted to a very great extent by the frame and wheels. To avoid this lateral tendency of a two-wheel machine, I construct the forward segment so that the draft of the animals may come directly thereon and at different points. This is best done by applying a series of eyes, $h$, to the segment, and then attaching the evener, by means of a chain or connection, $i$, to one of those eyes or points on the segment, which will bring the draft farther from that side of the machine toward which it tends to run, and, as indicated in Fig. 1, the link or connection from the evener running through a loop or link, $l$, on the pole, as indicated in Fig. 2. The series of eyes enables the adjustment of the draft according to the different angles of lateral resistance which the machine is required to meet. By this adjustable draft attachment I am enabled to arrange the scraper practically upon two wheels. The adjustable draft attachment also prevents the pole from being thrown against the one animal toward which the draft tends to turn—that is, the draft may be made central irrespective of the angle of the scraper. By this construction I am enabled to make the scraper adjustable to various angles and different elevations.

I make no claim in this application, broadly, to the segments and the scraper adapted to be turned either edge up, as such construction is the subject of another application filed of even date herewith.

I claim—

1. In a road-scraper, the combination of a single axle, A, carrying the wheels B B, the beam or pole C, attached to said axle and extending forward, the two segments F G below, one forward of and the other in rear of the axle, both hung to the axle, and so as to be adjustable upward and downward, and the scraper O, hung to said segments and made adjustable thereon to different angles, substantially as described.

2. The combination of the single axle A, two wheels, B B, the beam or pole C, attached to the axle and extending forward, a scraper arranged beneath the axle and adjustable to different angles to the direction of the path of movement of the wheels, and a series of draft-attaching devices, substantially such as described, arranged transversely across the machine, substantially as specified, and whereby the draft may be adjusted laterally according to the angle of the scraper.

MARCUS E. COOK.

Witnesses:
 JOHN E. EARLE,
 FRED C. EARLE.